July 14, 1931.　　　A. L. KLEES ET AL　　　1,814,935

FLUID FLOW REGULATING APPARATUS

Filed June 14, 1930　　2 Sheets-Sheet 1

Inventors
ALBERT L. KLEES
BENJAMIN GREENFIELD
By their Attorney

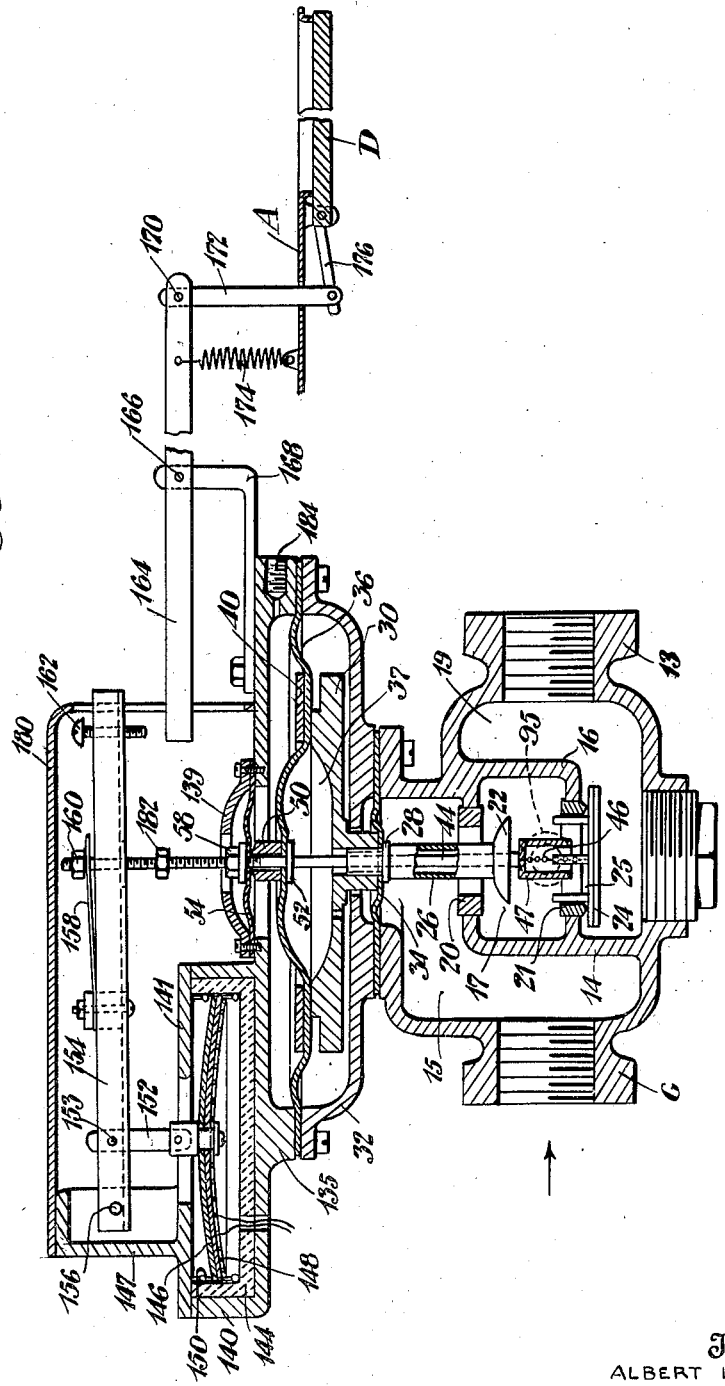

Patented July 14, 1931

1,814,935

UNITED STATES PATENT OFFICE

ALBERT L. KLEES, OF LONG BEACH, AND BENJAMIN GREENFIELD, OF JACKSON HEIGHTS, NEW YORK, ASSIGNORS TO SURFACE COMBUSTION CORPORATION, OF TOLEDO, OHIO, A CORPORATION OF NEW YORK

FLUID FLOW REGULATING APPARATUS

Application filed June 14, 1930. Serial No. 461,112.

The present invention relates to automatic fluid flow control valves, and more especially it relates to combined gas pressure regulators and automatic cut-off valves, having special utility in connection with gas burning appliances adapted for use with domestic house heating furnaces.

Combined fluid pressure- and flow-regulating valves which comprise automatic cut-off mechanism, for service in gas-fired heating installations, are now well-known. They normally function to automatically open the gas line to a burner when there is a demand for heat at some selected point remote from the burner, for cutting off the flow of gas thereto when the demand for heat ceases, and for maintaining a uniform fluid pressure in the line to the burner during such flow. Apparatus of this general type is disclosed in our co-pending application for U. S. Patent #424,153 filed January 29th, 1930, of which this application is a continuation in part.

Such fluid flow control mechanism of the prior art has been open to the serious limitation of not being able to furnish a regulated gas pressure for the pilot burner, which is a vital element of heating installations of this character. Therefore it has been heretofore necessary to use a small secondary pressure regulator in the gas line leading to the pilot burner. In addition to the expense involved thereby, this arrangement is objectionable since such secondary pressure regulator occupies considerable space, which is frequently at a premium in a burner and burner control assembly of this type.

Among the more important objects of the present invention are to provide in an improved manner in a combined pressure regulator and cut off mechanism, for supplying gas continuously under a regulated gas pressure to a pilot burner associated therewith; to provide in a combined automatic cut-off valve and fluid pressure regulator for forcing the valve open by positive means to prevent any sticking of the valve in closed position due to accumulations of tar and the like thereon; to provide in an automatic cut-off valve operated by a heat-energized element for controlling the ventilation of the said element to modify its rate of responsiveness to the influence of an associated heating element; to provide in an improved manner in a compact unitary structure, a fluid pressure regulator and an automatic cut-off valve, each independently operated. These and other objects and advantages will be apparent from the following description of the invention.

In the accompanying drawings showing certain preferred embodiments of the invention;

Fig. 3 is a vertical section through another embodiment of pressure regulator and automatic cut-off valve.

Like reference characters refer to like parts appearing in the various figures.

Figure 1:
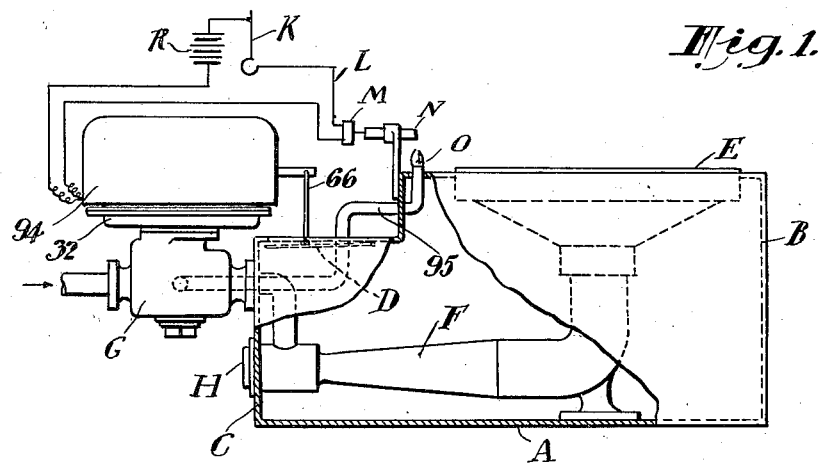
Fig. 1 is a somewhat diagrammatic view of a gas-burning assembly adapted for use with house heating furnaces, showing how the invention may be combined therewith.

Referring now to Fig. 1, the gas-burning appliance comprises a casing A having an upward extension B, a front closure C, and a secondary air damper D. Mounted within the extension B is a gas burner E to which a mixture of air and gas is supplied through a mixing tube F into which is conducted gas from the gas valve indicated here generally as G, and which forms part of the subject-matter of the present invention. The mixing tube F receives primary air through openings in the closure C, the latter being controlled by a shutter H. The secondary air damper D preferably is connected, in a manner later to be described, to the gas-valve operating mechanism, whereby when the valve is open to admit gas to the burner, the damper D will also be open to admit secondary air, and vice versa.

That portion of the casing A having the burner E is adapted to be positioned within the furnace to be fired, the balance of the casing extending outside of the furnace in the usual manner with installations of this type.

K designates a room thermostat in an electric circuit L which is adapted to be interrupted by a switch M controlled by a thermal element N adapted to be heated by a pilot burner O in such manner that when the pilot is burning, but not otherwise, the switch M will be closed. The circuit L is adapted when closed, as when there is a call for heat by the room thermostat, to actuate certain mechanism for opening the gas valve.

Figure 2:
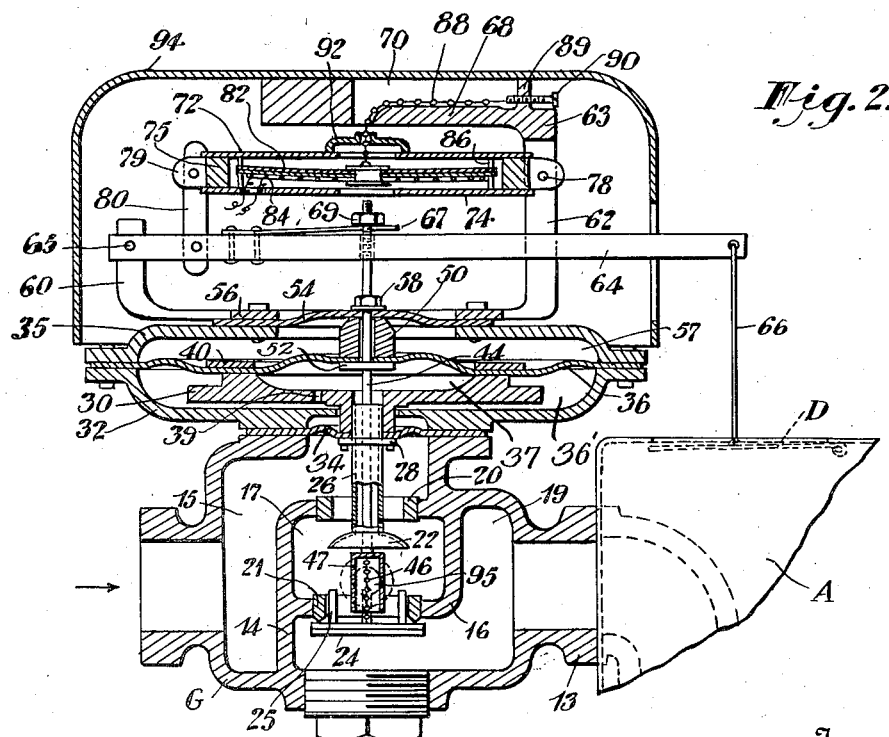
Fig. 2 is a vertical section through one embodiment of the combination pressure regulator and cut-off valve.

The combination pressure regulator and quick-acting cut-off valve illustrated in Fig. 2 comprises a valve housing G secured at its outlet end to the burner duct casing A. Partitions 14 and 16 within the valve housing co-operate with horizontal extensions thereof to define an inlet chamber 15, an outlet chamber 19 and a central chamber 17, the latter being in communication with the first-mentioned chambers through apertures in its respective top and bottom walls. The respective marginal portions 20 and 21 of the chamber 17 adjacent the apertures in the top and bottom walls thereof are adapted to function as valve seats for a pair of valves 22 and 24.

A hollow cup-shaped housing member 32 is mounted upon the valve housing G; and secured between these housing members is a flexible sealing-and-balancing diaphragm 34. A flexible pressure-regulating diaphragm 36 is secured between upper flanged margins of the housing 32 and flanges on a housing and supporting member 35, in such manner as to form a pressure-tight chamber 36′ between the diaphragm 36 and the bottom of housing 32.

The valve 22 has an upper convex surface and has secured thereto a hollow valve stem 26, the upper end of the latter being secured within a central aperture in a floating weight 30 by a flange 28 on said stem, the weight being secured to the pressure-regulating diaphragm 36 for movement therewith by means of bolts or the like co-operating with an annular ring 40. The midportion of the upper surface of the weight 30 is hollowed to form with the diaphragm 36 a central chamber 37 that is in communication with the chamber 36′ by means of a passageway 39 extending through the said weight.

The sealing diaphragm 34 is secured at its center to the hollow valve stem 26; and it is secured also to a depending portion of the weight 30 by means of bolts carried by a collar 28 mounted on the said valve stem 26.

To illustrate the functioning of the device as a low-pressure regulator, we will assume that the valve 22 is open,—as it normally is when the supply pressure of the gas flowing past this valve does not exceed a certain predetermined amount. In the event that the supply pressure exceeds said amount, the arrangement of parts is such that the gas pressure is transmitted through the interior of the hollow valve stem 26 into the chamber 37 and from thence through passageway 39 to the chamber 36′. This pressure raises the diaphragm 36 together with the valve stem 26 and valve 22 carried thereby, in a manner to securely seat the latter and temporarily cut off the flow of gas past the valve. When, thereafter, the pressure in the central chamber 17 of the valve housing is reduced to the desired degree as by the withdrawal of gas from the outlet end of the valve housing, there is a corresponding release of the pressure which has been acting upon the diaphragm 36, following which the weight 30 moves the valve stem 26 carried thereby downwardly to unseat the valve 22.

The mechanism employed in this embodiment of the invention for operating the assembly as an automatic cut-off valve includes a soft-faced valve disk 24 adapted to co-operate with the annular valve seat 21 in the bottom of chamber 17. Guide flutes 25 on the valve disk 24 serve to accurately direct the latter to its seat during the movement of the valve toward and away from its seat from time to time. The valve disk 24 is flexibly secured to the lower end of valve stem 44 by means of a short section of bead chain 46. The valve stem 44 extends longitudinally of and within the hollow valve stem 26, and is freely movable with respect to the latter. A short tubular member 47 of slightly less length than the chain 46 is secured to the lower end of the valve stem 44 and surrounds the major portion of the chain.

The valve stem 44 extends vertically through the diaphragm 36 and through a flexible sealing diaphragm 54, the latter of which is secured between a portion of the upper surface of housing member 35 adjacent a central opening therein and an annular portion of a lever-supporting member 56. The two diaphragms 36 and 54 are separated by a spool 50, and are movable with said stem 44, a nut 58 on the stem securing the parts in fixed relation. Means similar to the means 184 in Fig. 3 may be provided if desired for connecting the chamber 57 with a gas burner or the like for the purpose of conveying to the latter any gas leaking into chamber 57 past the diaphragm 36.

The lever-supporting member 56 has formed thereon at one side a vertical post 60; and a pair of spaced upright supporting members 62, 62 are disposed opposite the latter as shown. The upper portions of members 62 carry a transverse member 63 having a forward extension 68 provided with a U-shaped slot 70 in its upper surface.

A valve-and-damper-operating lever 64 has one end thereof pivotally mounted at 65 on the post 60, the opposite end of the lever being connected with the secondary air damper D by means of a rigid link 66. The lever 64 carries a flat spring 67 having an aperture near one end through which the upper portion of the valve stem 44 freely extends, the latter likewise passing through an enlarged aperture in the lever 64. An adjusting nut 69 permits adjustment of the valve stem 44 with respect to the lever 64 and spring 67.

For co-operating with the lever 64 to form a compound leverage system adapted for controlling the operation of the automatic cut-off valve, there is provided a hollow composite lever member 79 comprising a pair of flat circular metal plates 72, 74, spaced apart by a spacing ring 75, each of the said plates being provided with a central aperture. This hollow lever member is pivotally supported at one end on the posts 62 as indicated at 78 and at its other end is coupled to the lever 64 by a link 80.

The preferred form of heat motor shown in Fig. 2 comprises a bi-metallic disk 82 having an electric heating element 84 associated therewith,—the disk being adapted when in one thermal condition to assume a convexo-concave form, and when in another thermal condition to assume a concavo-convex form, the change in condition of curvature being accomplished suddenly with a snap action on either side of a dead center position of the disk. Disks having this type of action are commonly known as "clicker" disks. The bi-metallic disk and associated heating element are positioned between and in spaced relation with respect to each of the respective plates 72, 74 of the composite lever member, being held in such position by a plurality of metal pins 86 located at points adjacent the periphery of the disk and extending through the latter and into the plates 72, 74. The lead wires from the heating element 84 are in the circuit L.

The bi-metallic disk 82 and the plates 72, 74, may if desired be chromium-plated and they may be polished for the purpose of reducing to a minimum the heat losses due to radiation, without increasing the heat storage capacity of these parts.

Downward movement of the disk 82 beyond a predetermined point is prevented by a chain 88 coupled at one end to the center of the disk 82 and at its other end to an adjusting screw 90 carried by a lug 89 projecting from the upper end of the posts 62.

Adjustably mounted on the chain 88 is a ventilating hood 92 for regulating the ventilation of the space wherein the disk 82 is mounted.

For supplying gas under a regulated pressure to the pilot light O independently of whether or not the flow of gas to the main burner has been cut off by the valve 24, a conduit 95 leads from the central chamber 17 in the valve housing G to the pilot burner.

A cover 94 is provided for protecting the exposed parts of the valve-operating assembly, and may be carried by the housing member 35, or by the supporting member 56 and associated parts. A slot is provided in the cover through which the lever member 64 freely extends.

The following description will illustrate the functioning of the above described apparatus as an automatic cut-off valve. Assuming that the valve 24 is closed,—in the event there is a call for heat by the room thermostat, the circuit L is closed and the heating element 84 thereupon heats and energizes the bi-metallic element 82. Since hood 92 prevents natural ventilation about the bi-metallic disk, sufficient heat is quickly introduced into the disk to cause it to change its curvature with a sudden snap action. Thereupon the disk-carrying lever 79 turns about its pivot 78 in a counter clockwise direction with resultant clockwise turning of the lever 64 about its pivot 65 whereupon the valve 24 supported by the valve stem 44 is free to move from its seat. In case said valve should be stuck to its seat it will be forced therefrom by the tubular extension 47 at the lower end of said stem 44.

Downward movement of the lever 64, under the conditions named above, causes the secondary air damper D to open correspondingly, and permits the flow of secondary air therethrough to the burner. Any slight initial movement on heating of the disk 82 and the corresponding movement of the other members of the compound leverage system, before the sudden snap action movement occurs, is taken up by the flat spring 67 on the lever 64 in a manner to prevent substantial opening of the valve 24 under the influence of such slight initial movement of the disk, until the snap movement of the same through a substantial distance occurs, whereby the valve is opened widely. After the bi-metallic disk has snapped to the position with its upper surface convex, a relatively small amount of heat is required for maintaining the disk in such position due to the protective action of the plates 72, 74 and associated parts.

During the time the valve 24 is open, the valve 22 is free to function in the usual manner as a pressure-regulating device, both for gas flowing to the main burner and for that flowing to the pilot burner.

In the event the call for heat by the room thermostat ceases, the current flowing through the heating element 84 is cut off, and the bi-metallic disk is rapidly cooled thereafter by cool air flowing through the apertures in the spaced plates 72, 74, and around the bi-metallic disk, since during this time the hood 92 is spaced above the top plate 72. As cooling of the bi-metallic disk continues, a point is reached at which the latter suddenly again changes its curvature and takes the position shown in Fig. 2, whereby the valve 24 together with the valve stem 44 and associated parts, and the various members of the compound leverage system are elevated accordingly, and supported in such position by the flexible chain 88, with the valve 24 securely seated and with the secondary air damper D closed.

In adjusting the cut-off valve-operating mechanism for service, the position of the lever 64 is first adjusted by means of nut 69 when valve disk 24 is securely seated and the release spring 67 is properly compressed. The relative position of the disk-carrying lever member 79 is then adjusted by adjusting the chain by means of its adjusting screw 90 in such manner that when the bi-metallic diaphragm 82 is cold, the spring 67 is compressed until it is brought almost into metal to metal contact with the lever 64.

In the modification of the invention shown in Fig. 3, the pressure regulating mechanism is similar to that of Fig. 2. The cut-off valve-operating mechanism includes a housing member 135 mounted upon the upper flanged margin of the housing member 32. The flexible pressure-regulating diaphragm 36 is secured between these members in the same manner as shown in Fig. 2. The housing member 135 has therein a large central aperture; and a sealing diaphragm 54 is secured by this member between the margins thereof surrounding the said aperture and an annular retaining and reinforcing member 139. One portion of the housing 135 is shaped to form a well 140 lined with heat insulating material 144, and adapted to house a heat motor assembly, the latter of which includes a resilient bi-metallic diaphragm or disk 146 and a heating element 148 associated therewith. The well 140 is provided with an apertured cover plate 141 secured thereto by bolts or the like, the cover having formed thereon an upright portion 147.

The bi-metallic element is supported within the well 140 by means of a plurality of spacing pins 150 located adjacent the periphery of the bi-metallic disk. The bi-metallic disk is connected at its center, by means including a link 152, with a mid-portion of a lever member 154, one end of which is pivoted as at 156 to the upright portion 147 of the well cover.

The lever 154 carries a flat spring 158 having an aperture through which the upper portion of the valve stem 44 freely extends, the latter also passing through an enlarged aperture in the said lever. An adjusting nut 160 permits adjustment of the valve stem 44 with respect to the lever 154 and the spring 158. A second adjusting nut 182 on the valve stem 44 is adapted to cooperate with the lever 154 when the latter is depressed, and to force open the valve 24 in the case of sticking of the latter due to any accumulations of materials around the valve seat. An adjusting screw 162 mounted on the lever 154 is adapted to cooperate with one end of a lever arm 164 pivotally mounted on a supporting member 168 carried by the housing member 135. The opposite end of the lever arm 164 is secured to the secondary air damper D by means including a link member 172 and an arm 176 of the damper D. A tension spring 174 has its ends secured respectively to the burner casing and to the lever arm 164 adjacent the connection thereof with the link 172.

The operation of the apparatus assembly shown in Fig. 3 when functioning as a low pressure regulator, is in manner similar to the operation of that shown in Fig. 2. Its operation as an automatic cut-off valve is as follows: As illustrated in Fig. 3, the bi-metallic element 146 is cold, and has its upper surface convex in shape. In this condition, forces inherent in the said disk maintain the valve 24 securely to its seat by means of pressure transmitted thereto through the lever 154, valve stem 44 and the associated parts. The screw 162 is out of contact with the lever arm 164, and therefore the damper D is maintained in closed position under the influence of the spring 174.

Upon a call for heat from the room thermostat, the heating element associated with the bi-metallic disk 146 functions to heat the latter until the point is reached at which the latter suddenly changes in its curvature in a manner to have its upper surface concave. The force thus developed is transmitted through the link 152 to the lever 154 which moves downwardly, releasing the valve stem 44 and thereby opening the valve 24. As the end of the lever 154 carrying the adjusting screw 162 moves downwardly the latter contacts with the lever arm 164 and functions to open the secondary air damper D against the resistance of the spring 174.

An opening 184 in the housing member 135 permits the removal from the system of any gas escaping upwardly past the diaphragm 36, should this occur. A cover member 180 carried upon the housing 135 and plate 141, is provided for the protection of the valve-operating mechanism.

The portion of the diaphragm 36 assisting to form the chamber 37 functions to allow free relative movement between the valve stems 26 and 44. The effective area of the diaphragm 36 forming the top of the chamber 37 is greater than the seating area of the valve 24, and consequently there will be a slight upward force developed by regulated pressure under the central portion of the diaphragm 36 tending to hold the valve 24 to its seat. In other words, the cut-off valve 24 is slightly unbalanced in its closed direction, for assisting in the maintenance of a tight closure of the valve.

One important feature of the invention resides in the employment of two valves in a unitary valve housing, both valves being operated by means of concentric valve stems, one valve functioning continuously as a low pressure regulator and the other functioning as an automatic cut-off valve, when and as required. The gas supplying the pilot burner is taken off from the valve body at a point between the two valve disks, so that the pilot burner may always be supplied with gas under a regulated pressure, even though the cut-off valve is seated in a manner to prevent the flow of gas to the main burner.

Both the closing and opening movement of the valve 24 is positive in action and under the control of the bi-metallic element. The insulating material 144 in the modification shown in Fig. 3 is adapted to allow quick heating of the bi-metallic disk without undue dissipation of electric energy by preventing the flow of heat to the surrounding castings. Likewise the spacing members 150 are kept small in mass and are each provided with but four points of contact with the bi-metallic element in order to reduce heat conduction losses to a minimum.

The valve body itself is a very simple casting of iron or the like, requiring a minimum of machine work. It is not essential to guide the valve stem accurately, since a rigid valve stem is not employed and since it is readily possible always to seat the valve accurately by means of the flexible coupling 46 and the fluted guides 25. Avoidance of close machine work and the careful alignment and fitting of parts is further facilitated by the employment of bead chain linkages. The use of a compound leverage system, one member of which contains the bi-metallic member itself, makes possible a design which is very neat in appearance and at the same time is very compact.

A highly efficient utilization of the force developed by the bi-metallic element is effected by reducing to a minimum the friction and binding of all moving parts. The valve disk itself is guided to its seat only by vertical flutes, carried by the valve disk itself and loosely fitting the bore of the opening in the valve seat. Side strains, friction and unequal valve-seating pressure at the periphery of the valve seat are prevented by connecting the valve disk to its stem by means of a short section of bead chain, or its equivalent, such as a free moving universal joint. Flexible leather diaphragms are used in the place of stuffing boxes and glands; and the valve stem has no metal guides to impede its free vertical motion.

Electrical consumption is reduced to the minimum by closely contacting the bi-metallic element with its heating coil; by keeping the mass of the material to be heated as low as practicable; by keeping the amount of radiating surface as low as possible by nickel or chromium plating and polishing these surfaces; by minimizing the conduction of heat away from the bi-metallic element by the utilization of bead chain suspension members; and by controlling the circulation of air past the bi-metallic element and associated parts. The automatic cut-off valve is balanced against inlet gas pressure under all conditions, and therefore it will function properly on wide variations of service gas pressure, even when powered with a relatively weak, bi-metallic element.

By utilizing a combination low pressure regulator and cut-off valve of the character hereinbefore described, it is possible to accomplish the various objects of the invention set forth, and to produce at a relatively low cost an apparatus which is simple of construction and highly efficient in operation.

The invention is susceptible of modification within the scope of the appended claims.

We claim:

1. In a combined pressure regulator and cut-off valve mechanism of the character described, the combination of a valve casing having inlet and outlet ends, a central chamber therein in communication with the respective inlet and outlet ends through apertures in the chamber walls, a valve in each of said apertures, a pressure-regulating diaphragm and chamber, a pair of concentric valve stems, one of the latter being operatively interposed between one of the valves and the pressure-regulating diaphragm, the other of said valve stems being adapted to operatively associate the other valve with an independent valve-actuating means.

2. In a combined pressure regulator and cut-off valve mechanism of the character described, the combination of a valve casing having inlet and outlet ends, a central chamber therein in communication with the respective inlet and outlet ends through apertures in the chamber walls, a valve in each of the said apertures, a pressure-regulating diaphragm and chamber, a pair of concentric valve stems, one of the latter being operatively interposed between one of the valves and the pressure-regulating diaphragm, the other valve stem being adapted for operatively associating the other valve with a heat motor.

3. Apparatus as defined in claim 2 in which the said heat motor includes a plurality of members forming a compound leverage system having as an element thereof a resilient bi-metallic member having respective concave and convex surfaces and adapted when energized to reverse the curvature of the said surfaces with an instantaneous snap action, and means for energizing the latter.

4. Apparatus as defined in claim 2 in which the said heat motor includes a plurality of members forming a compound leverage system having as an element thereof a resilient, bi-metallic member having respective concave and convex surfaces and adapted when energized to reverse the curvature of the said surfaces with an instantaneous snap action, means for adjusting the said bi-metallic member to vary the energy which must be developed by said last named member to effect such change in curvature, and means associated with the bi-metallic member and with a room thermostat for energizing the former.

5. In a combined pressure regulator and cut-off valve mechanism of the character described, the combination of a valve casing having inlet and outlet ends, a central chamber therein in communication with the said respective inlet and outlet ends through apertures in the chamber walls, a valve in each of the apertures, a pressure-regulating diaphragm and chamber, a pair of valve stems, one of the latter of which is operatively interposed between one of the valves and the pressure-regulating diaphragm, the other valve stem being adapted to operatively associate the other valve with a heat motor through means including a yielding member, the said heat motor comprising a resilient member adjustably supported at a mid-portion thereof and being so disposed as to form one element of a compound leverage system, means for actuating the said resilient member, and stop members associated with the last-named valve stem for initiating movement of the latter in either direction under the influence of motion transmitted thereto from the resilient member.

6. In the combined pressure regulator and cut-off valve mechanism associated with a burner assembly that includes a secondary air damper, the combination with a diaphragm and its chamber, and a valve casing having therein partitions defining a central chamber in controlled communication with the inlet and outlet ends of the said casing, apertures in the central chamber walls, valves for closing each aperture, a passage extending from the central chamber to the said diaphragm chamber, one of the said valves normally being movable with said diaphragm to permit the latter to regulate the pressure at the outlet side of the casing, a pivoted resilient, bi-metallic member operatively associated with the other of said valves and with the secondary air damper for actuating each of the latter in each of a plurality of directions, and yielding means associated with the last-named valve for resisting initial movement of the latter in either direction under the influence of energy transmitted thereto from the bi-metallic member.

7. In a combined pressure regulator and cut-off valve associated with a burner assembly including a secondary air damper, the combination of a valve casing having inlet and outlet ends, a central chamber therein in communication with the respective inlet and outlet ends through apertures in the chamber walls, a valve in each of the apertures, a pressure-regulating diaphragm and chamber, a secondary air damper, a pair of concentric valve stems defining a passage extending from the central chamber to the said diaphragm chamber, one of the valve stems being operatively interposed between a valve and the pressure-regulating diaphragm, the other of said valve stems being adapted to operatively connect the other valve with a resilient bi-metallic member and with a secondary air damper through means including a yielding member.

8. In a combined pressure regulator and cut-off valve mechanism associated with a supply line leading to a burner provided with a secondary air damper, the combination of a valve casing having inlet and outlet ends, a central chamber therein in communication with the respective inlet and outlet ends through apertures in the chamber walls, a valve in each of the apertures, a pressure-regulating diaphragm and chamber contiguous to the valve casing, a pair of concentric, spaced valve stems leading from the central chamber to the said diaphragm chamber, one of the said valve stems being operatively associated with the regulating diaphragm, the other valve stem being operatively interposed between the other of said valves and a heat motor, the latter comprising a resilient bi-metallic member supported at its mid-portion by a flexible member and so disposed as to form one element of a compound leverage system, another element of which system is directly connected with both the last-named valve and with the secondary air damper, and means responsive to a room thermostat for actuating the bi-metallic member.

9. In a combined pressure regulator and cut-off valve mechanism associated with a supply line to a burner having a secondary air damper, the combination of a valve casing having inlet and outlet ends, a central chamber therein in communication with the respective inlet and outlet ends through apertures in the chamber walls, a valve in each of the apertures, a pressure-regulating diaphragm and chamber, a pair of concentric, spaced valve stems secured to the respective valves and defining a passage leading from the central chamber to the diaphragm chamber, one of the said valve stems being operatively interposed between a valve and the pressure regulating diaphragm, the other valve stem being operatively associated with automatic valve-operating means including a compound leverage system, one element of which is a resilient, bi-metallic member having respective concave and convex surfaces and adapted when energized to reverse the curvature of the said surfaces with an instantaneous snap action, means for freely supporting said bi-metallic member at a mid-portion thereof, means for housing the bi-metallic member, and means for controlling the ventilation of the said housing.

10. Apparatus as defined in claim 9 including means forming part of the compound leverage system for operatively associating the bi-metallic member with a secondary air damper.

11. In a combined pressure regulator and cut-off valve mechanism, the combination of a valve casing having inlet and outlet ends, a central chamber therein in communication with the respective inlet and outlet ends through apertures in the chamber walls, a valve in each aperture, valve stems respectively secured to the respective valves, a pressure-regulating diaphragm and chamber, a passage leading from the central chamber to the diaphragm chamber, one of the valve stems being operatively connected with the pressure-regulating diaphragm, the other of the said valve stems being associated with a valve-operating mechanism which includes a bi-metallic, resilient member having respective concave and convex surfaces and adapted when energized to reverse the curvature of the said surfaces with an instantaneous snap action, means associated with the bi-metallic member and with a room thermostat for thus energizing the same, and adjustable means for freely supporting the bi-metallic member and for varying the energy requirements of the bi-metallic member for inducing the snap action.

12. Apparatus as defined in claim 11, including a pair of spaced plate members having central apertures and adapted to house the said bi-metallic member, and means for positioning the latter between the said plates and in spaced relation therewith.

13. Apparatus as defined in claim 11 including a pair of spaced plates having central apertures and adapted to house the said bi-metallic member, means including a flexible element for supporting the bi-metallic member at a mid-portion thereof, independent means contacting with the marginal portions of the said bi-metallic member for positioning the bi-metallic member between the said plates and in spaced relation thereto, a closure associated with the said flexible element and adapted when the bi-metallic member is in one position to serve as a closure for the aperture in one of the said plates and adapted when the bi-metallic member is in another position to be held in spaced relation with respect to such aperture whereby the respective heating and cooling of the bi-metallic member is facilitated.

14. In a combined pressure regulator and cut-off valve mechanism, the combination of a valve casing having inlet and outlet ends, a central chamber therein in communication with the respective inlet and outlet ends through apertures in the chamber walls, a valve in each aperture, valve stems respectively secured to the respective valves, a pressure regulating diaphragm and chamber, a passage leading from the central chamber to the diaphragm chamber, one of the valve stems being operatively connected with the pressure-regulating diaphragm, the other of the said valve stems being associated with a valve-operating mechanism which includes a bi-metallic, resilient member having respective concave and convex surfaces and adapted when energized to reverse the curvature of said surfaces with an instantaneous snap action, means associated with the bi-metallic member and with a room thermostat for thus energizing the same, a pair of spaced plates having central apertures and adapted to house the said bi-metallic member, and means for positioning the latter between the said plates and in spaced relation therewith, at least one of the said plates having a polished surface for the purpose of minimizing loss of heat by radiation.

15. In a combined pressure regulator and cut-off valve mechanism associated with a supply line leading to a burner provided with a pilot burner, the combination of a valve casing having inlet and outlet ends, a central chamber therein in communication with the respective inlet and outlet ends through apertures in the chamber walls, each aperture being provided with a valve, a pressure-regulating diaphragm and chamber, a valve stem operatively interposed between one of the valves and the pressure-regulating diaphragm, and pipe means connecting the central chamber with the pilot burner.

In testimony whereof I affix my signature.
ALBERT L. KLEES.
In testimony whereof I affix my signature.
BENJAMIN GREENFIELD.